United States Patent [19]
Adler

[11] Patent Number: 5,134,411
[45] Date of Patent: Jul. 28, 1992

[54] NEAR RANGE OBSTACLE DETECTION AND RANGING AID

[75] Inventor: Zdenek Adler, West Hempstead, N.Y.

[73] Assignee: General Microwave Corporation, Amityville, N.Y.

[21] Appl. No.: 553,890

[22] Filed: Jul. 13, 1990

[51] Int. Cl.⁵ .................... C01S 13/38; C01S 13/93
[52] U.S. Cl. .............................. 342/130; 342/128; 342/70
[58] Field of Search ................ 342/127–132, 342/70

[56] References Cited

U.S. PATENT DOCUMENTS

| | | | |
|---|---|---|---|
| 3,112,481 | 11/1963 | Goldberg | 342/128 X |
| 3,150,367 | 9/1964 | Harrington | 342/128 |
| 3,789,398 | 1/1974 | Erst | 342/128 |
| 4,044,354 | 8/1977 | Bosher et al. | 342/130 X |
| 4,354,192 | 10/1982 | Kohler | 342/128 |
| 4,901,083 | 2/1990 | May et al. | 342/128 |

OTHER PUBLICATIONS

Jacobson et al., "Microwave Distance Mekr with ±2.5 mm Resolution" Conf. 5th European Microwave, Hamburg, Germany, Sep. 1975.

Primary Examiner—Gilberto Barrón, Jr.
Attorney, Agent, or Firm—Volpe and Koenig

[57] ABSTRACT

A range detection apparatus comprising means for generating high frequency energy over a finite frequency range and for frequency modulating over a limited range of bandwidth the generated signal. A first path provides a phase reference while a second path provides for transmitting and receiving the signal. Along one of the two paths, the frequency modulated signal is phase shifted at a plurality of predetermined frequency values over a finite frequency range of bandwidth and at a predetermined plurality of phase-shifting values (greater than two) and at combinations of phase-shifting and frequency values to improve the relative range resolution. The signal in one path is phase compared to the signal in the second path to produce range measurement signals related to the combined phase shifts of the two paths, the results of the phase comparison, and the combinations of phase states of the phase shifts and frequencies of the frequency modulated signal.

10 Claims, 13 Drawing Sheets

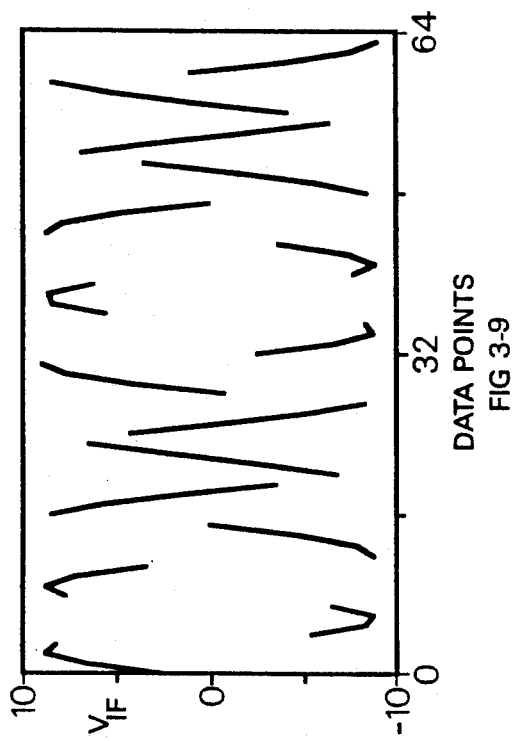
FIG 3-8
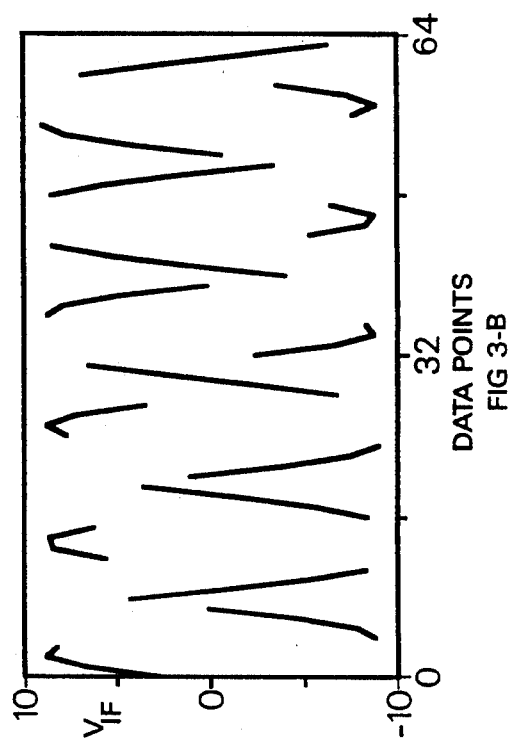
FIG 3-9
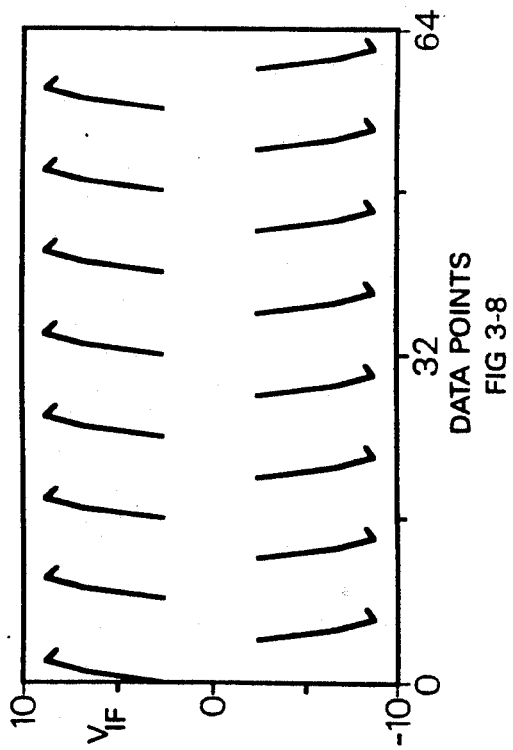
FIG 3-A
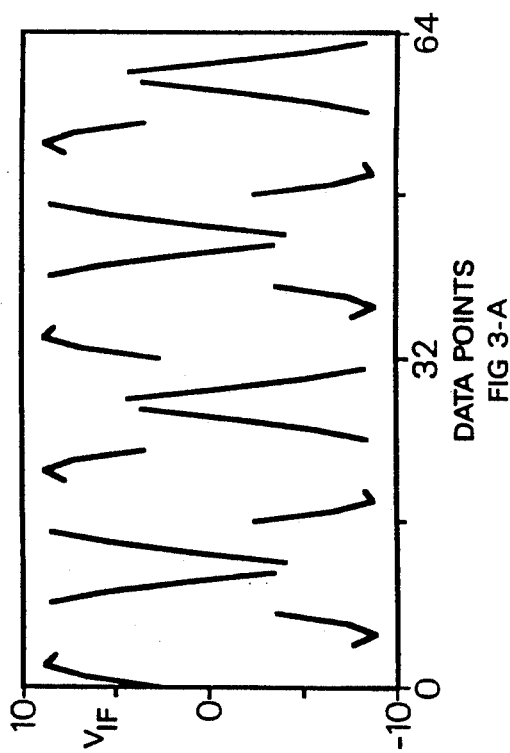
FIG 3-B

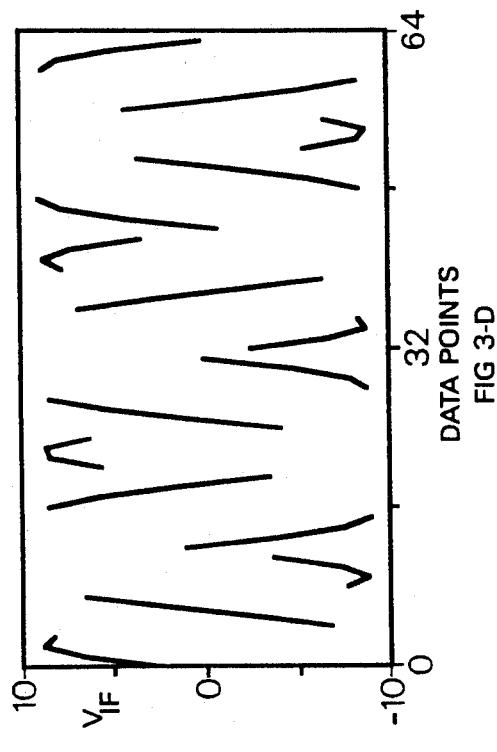
FIG 3-C
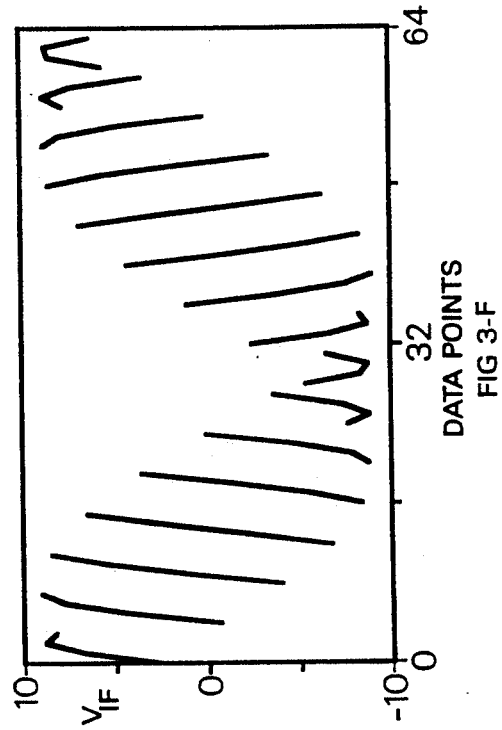
FIG 3-D
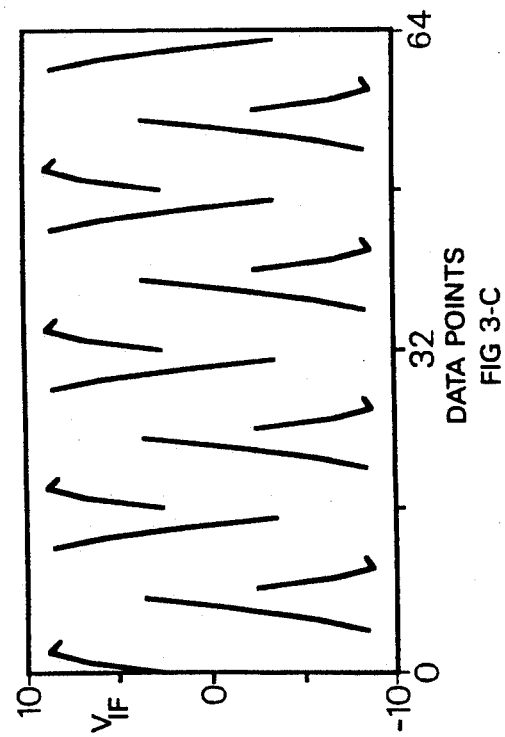
FIG 3-E
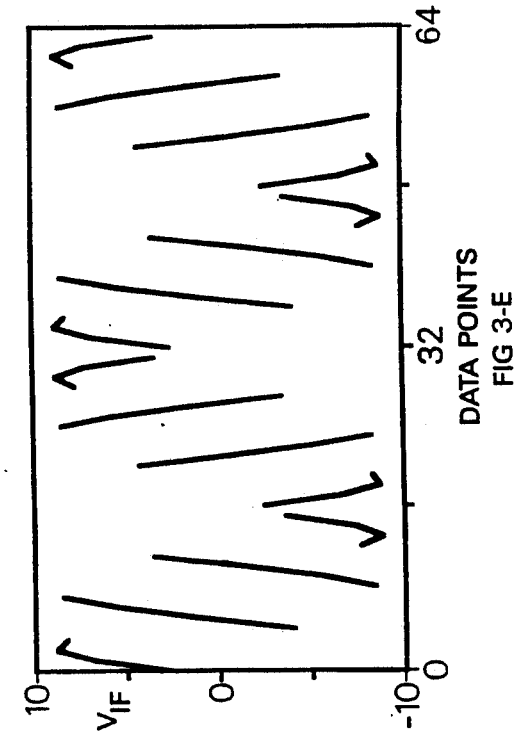
FIG 3-F

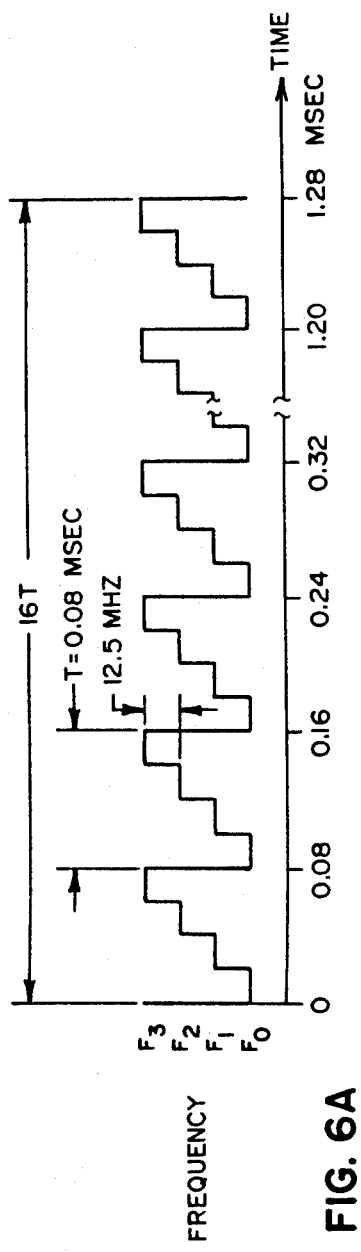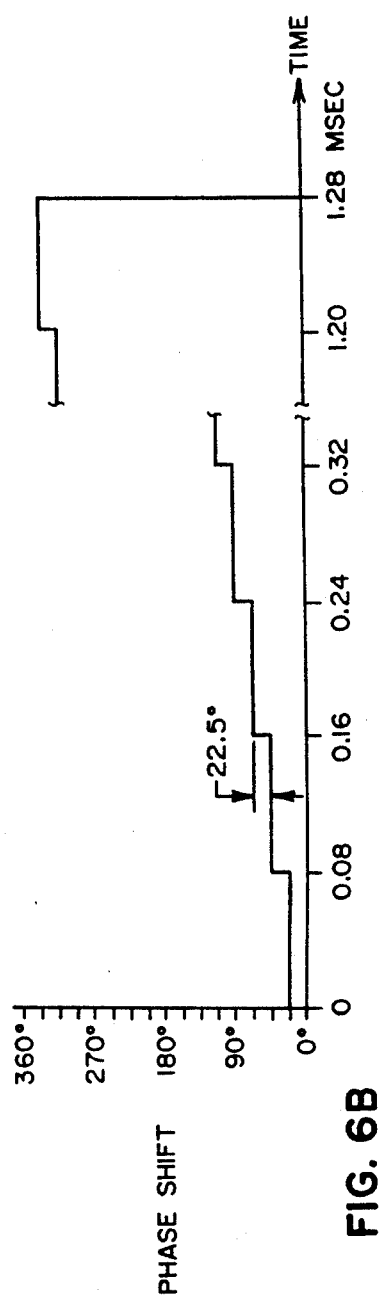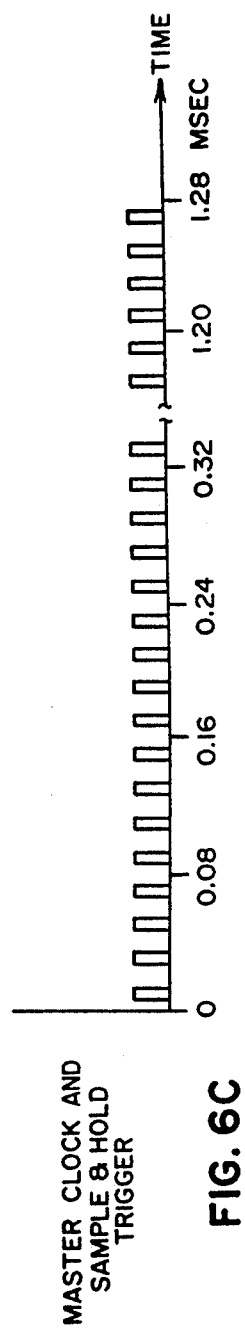
FIG. 6A
FIG. 6B
FIG. 6C

NEAR RANGE OBSTACLE DETECTION AND RANGING AID

BACKGROUND OF THE INVENTION

This invention relates to obstacle detection systems for vehicles. Such systems must alert a vehicle operator to the presence of near and distance objects and direct and reflected radiation must be employed.

In the prior art obstacle detection systems infrared and ultrasonic radiation generally have disadvantages that discourage their use. Microwave radiation on the other hand is commonly used in a variety of forms of radar systems, and the advantages of the microwave radar technology make it attractive for obstacle detection systems as well. See the article "Automotive Radar: A Brief Review" by D. M. Grimes and T. O. Jones in Proceedings of the IEEE, Jun., 1974, pp.804-822 and the relevant prior art literature cited therein.

The assigned microwave operating spectrum for radar, for example, is in the X-band, in the range of 8.0 to 12.0 GHz. A particular operating band applicable to obstacle detection systems has been set aside by the Federal Communications Commission in the range from 10.50 to 10.55 GHz. For this frequency range, microwave components are reasonable in cost and size; for example a planar antenna is approximately 1×2 inches in area. However, the limitations of this available bandwidth makes it difficult to achieve an adequate resolution of targets. For example, resolution below a minimum of 10 feet in distance is not readily obtainable with a limited bandwidth FM/CW radar system. Resolution of 5, 2.5 or even 0 feet would be advantageous for obstacle detection and warning for vehicles; yet it has not been available due to bandwidth limitations. Multiple obstacles should be detectable, but such a facility has not been available.

OBJECT OF THE INVENTION

It is among the objects of this invention to provide a new and improved obstacle detection and warning system.

Another object is to provide a new and improved microwave radar system useful as an obstacle detection system.

Another object is to provide a new and improved radar system for use with available frequency bandwidth and having a sufficiently high resolution.

Another object is to provide a new and improved radar system for detecting the closest obstacle among multiple obstacles.

SUMMARY OF THE INVENTION

In accordance with this invention an obstacle detection apparatus comprises: means for generating high frequency energy over a finite frequency range and for frequency modulating over a limited range of bandwidth such high frequency energy and for supplying said frequency-modulated high frequency energy to a first path providing a phase reference. A second path includes transmission and receiving sections, and the transmission section includes means for radiating the said frequency modulated high frequency energy into space in the form of propagating waves, while the receiving section includes means for receiving a portion of said radiated energy after reflection from a remote object. The radiated energy portion acquires a phase shift related to the distance traveled by said radiated energy and to the frequency of the radiated energy. In one of said paths a means serves to phase shift frequency-modulated high frequency energy in that one path in a certain configuration of repeated cycles of frequency modulation to improve resolution attainable with said limited range of bandwidth. In the receiving section, means for comparing the phase of frequency-modulated energy with the phase of the reflected radiated energy serves to produce signals related to the phase-shifts of said first and second paths and corresponding to the phase-shift produced over the distance travelled by the radiated energy portion and the reflection thereof from the remote object. A distance signal is derived in accordance with the phase states of said phase shifter and related to the frequencies of said energy generating and modulated means.

In accordance with an embodiment of this invention, the means for deriving a distance signal includes means for transforming said sinusoidal voltage wave from the time domain to the frequency domain including means for performing a fourier analysis thereon. Also in accordance with one embodiment of this invention, the phase-shifting means is in the reference path, but other locations are suitable.

BRIEF DESCRIPTION OF THE DRAWING

The foregoing and other objects of this invention as well as the invention itself may be more fully understood from the following description when read together with the accompanying drawings, in which corresponding parts are referenced by similar numerals throughout, and in which:

FIGS. 6A thru 6C are an idealized timing and waveform diagram illustrating the operation of parts of the system of FIG. 1.

DETAILED DESCRIPTION OF THE INVENTION

Figure 1:
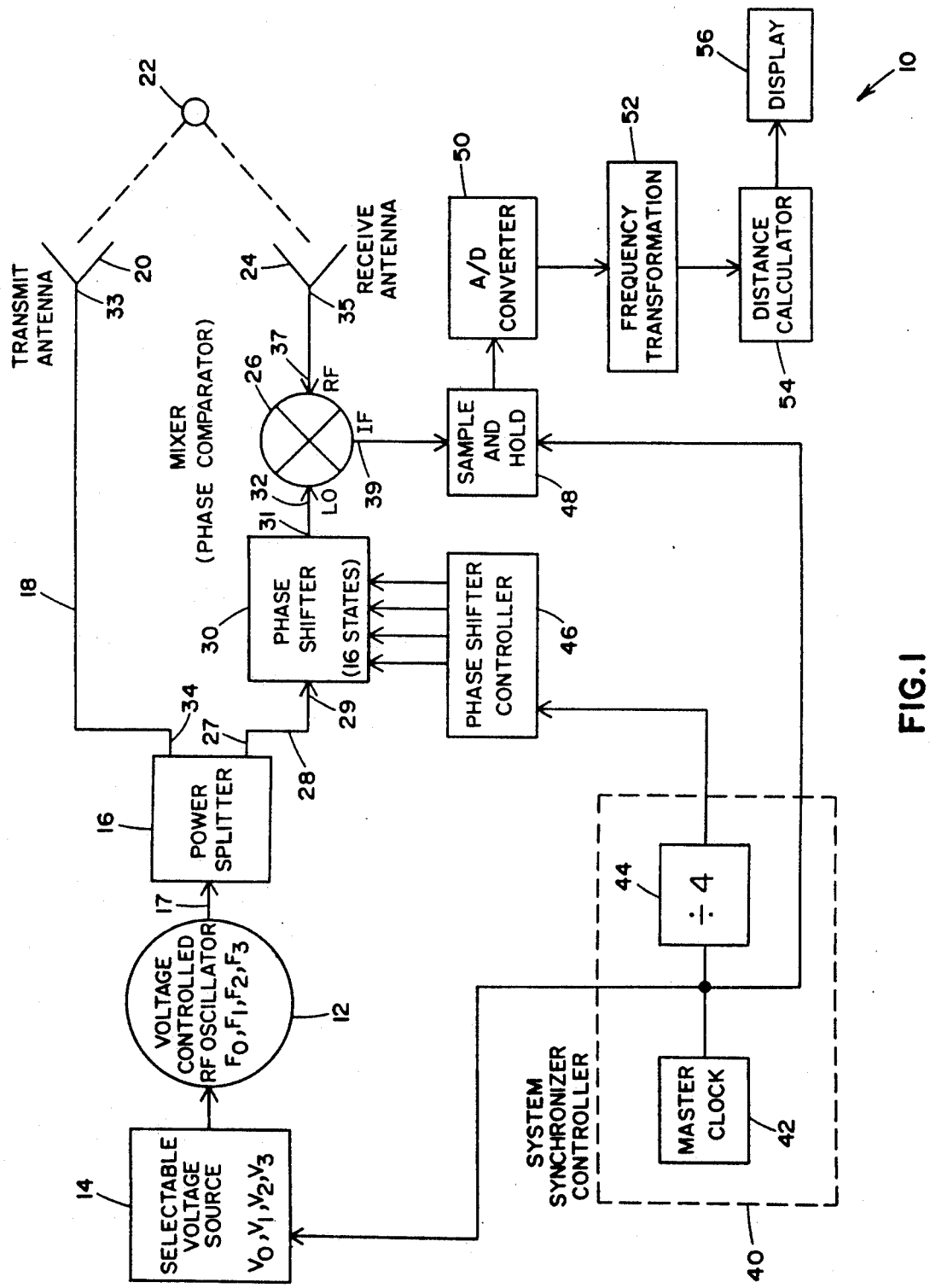
FIG. 1 is a schematic block diagram of an obstacle detection and warning system embodying this invention.

In the system 10 of FIG. 1 for radar ranging, a voltage-controlled oscillator 12 (VCO) generates the basic rf signal as a continuous wave (CW) with a periodic frequency modulation (FM) superimposed in accordance with a periodic modulating voltage from a selectable source 14.

The r-f voltage from the VCO 12 is applied via a power splitter 16 and transmitting rf path 18 to a transmitting antenna 20. The latter radiates a corresponding electromagnetic wave to a remote target 22, and the radiation reflected from the target returns to a receiving antenna 24. The reflected rf signal is supplied to the rf input of a mixer 26. Another rf path 28 from the power splitter 16 supplies the FM-CW signal to a phase shifter 30, which shifts the phase of that signal in a certain periodic configuration and applies the phase-shifted signal to the LO (local oscillator) input 32 of the mixer 26.

Voltage Controlled Oscillator—The frequency of the VCO 12 is determined by the applied control voltages $V_0, V_1, V_2, V_3$ from the source 14 and can be varied over the operating band in several ways. Among them are:

a. Continuously increasing or decreasing frequencies over a fixed period T. This is usually referred to as a linear frequency-modulated continuous wave (linear FM-CW signal). This type of frequency modulation can be used with either an analog or digital signal processing system.

b. Step-wise increasing frequencies are preferable for the digital signal processing approach. For optimum signal processing efficiency, the generated frequencies should be equally spaced.

Figures 1, 3:
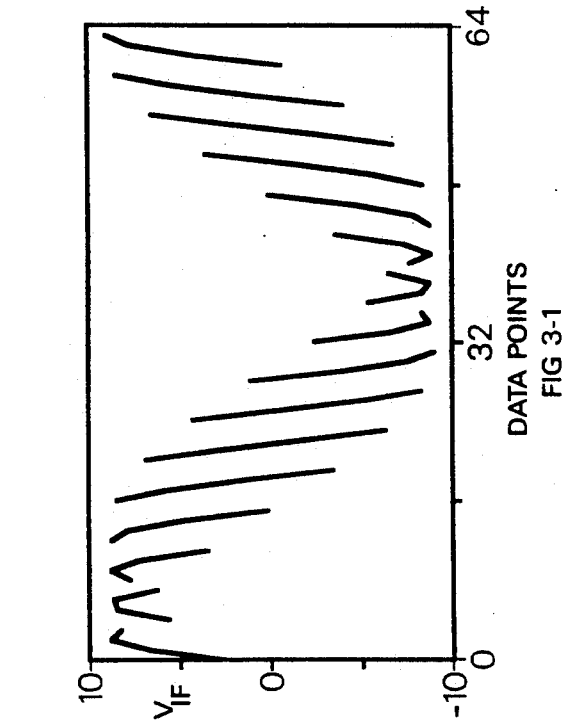
FIGS. 3(0) thru 3(F) are a schematic diagram of 16 graphs each (numbered hexadecimally from 0 to F in its lower left-hand corner) serving as an example of signal data from the system of FIG. 1 and reconstructed in the process of FIG. 4A.
Figure 3:
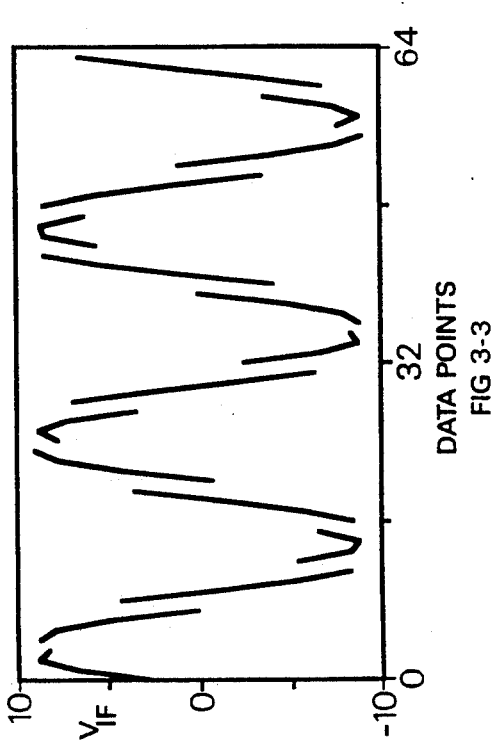

The present best mode of the invention uses the step-wise frequency modulation scheme. Four frequencies are generated during each period. They are spaced 12.5 MHz apart, beginning at 10.5 GHz and ending at 10.5375 GHz. Each frequency state is energized for a period of 0.02 msec. Therefore, each frequency sweep period has an 0.08 msec. duration as shown in FIG. 6.

Power Splitter—The power splitter 16 is a 3-port device (e.g. a Wilkinson power divider or a quadrature coupler with the isolated port terminated). The energy of the signal at the input port 17 is split equally between output ports 27 and 34. The phase difference between the signals at these ports must not change significantly for any of the frequencies at which the system operates. The actual value of the phase difference is not important to the function of the system.

Transmitting and Receiving Antennas—The signal energizing the transmitting antenna 20 at its input port 33 is transmitted with a directional pattern determined by the geometry of the antenna. Part of the signal is scattered with an undetermined pattern and amplitude from an object 22. Some of that scattered energy will appear at the receiving antenna 24 and is available at port 35. The amplitude of the received signal depends on (i) the directional (gain) patterns of both antennas, (ii) the transmitting range from antenna 20 to target 22, (iii) the scattering characteristics of the target 22 and (iv) the range from target 22 to receiving antenna 24.

The directional patterns of both antennas 20 and 24 and their relative location and orientation should be such that the magnitude of the leakage signal propagating directly between the antennas, that is between the points 33 and 35 should be minimized.

Mixer—The mixer (or phase comparator) can be either a 2-or 3-port device. The latter version has been employed in the present embodiment. The 3-port device (e.g. a double balanced mixer) has reference, input and output ports 32, 37, and 39, respectively. They are also commonly referred to as the LO, RF and IF ports respectively. (In the 2-port device e.g., a single-balanced Mixer, the LO and RF ports use a single port).

In this embodiment the function of the Mixer is essentially that of a "two-quadrant" phase comparator. As such, the voltage at output port IF is a sinusoidal function of the phase difference between $\theta_{ref}$, the phase of the voltage at the reference point 32 and $\theta_{inp}$, the phase of the voltage at the input port 37. Mathematically, this function is $$v_{out} = a \sin(\theta_{ref} - \theta_{inp}) + b$$

where a is device-dependent voltage scaling factor, and b is a fixed residual offset voltage, which, for the purpose of demonstrating the function of the system, can be assumed to be zero. Consequently, if the voltages at the input and output ports are either in phase (0° difference) or out of the phase (180° difference), then the voltage at the output port will be zero. Likewise for phase differences of +90° and −90° the output voltages are +a and −a respectively. For all other phase differences, the output voltage varies between +a and −a in a sinusoidal fashion.

Phaseshifter—The phaseshifter 30 is an insertable 2-port device. With the device energized at the input port 29, the phase of the rf voltage at the output port 31 can be changed by means of a signal applied to the control port. The range over which the phase can be changed is 360° and it can be changed either continuously, as in an analog phaseshifter, or in a fixed number of steps, as in a digitally controlled phaseshifter. For a fixed control signal, the phase change must not vary significantly over the system operating band.

In this embodiment of the radar system, the phaseshifter is digitally controlled. The phase of the signal at the output port can be set to any one of the 16 equally spaced 22.5° steps by means of a 4-bit digital control signal.

D/A Selectable Voltage Source—This control device sequentially applies one of four voltages to the VCO, each for a 0.02 msec. duration. For a single operating period, the sequence of four voltages is repeated 16 times for a total duration of 1.28 msec. The timing is controlled by the system synchronizer/controller 40.

7. Phasestate Controller—This device applies a 4-bit digital signal to the phaseshifter. Each of the possible 16 phase steps lasts for a period of 0.08 msec sec, synchronized with the A/D selectable voltage source by means of the system synchronizer/controller. The total time interval required for all 16 phase states is 1.28 msec.

8. A/D Converter/Sampler—This device samples the voltage at the output port of the mixer 26 every 0.02 msec and converts the sampled voltage into a 12-bit digital number (−2046 to +2045). A total of 64 samples is taken during the 1.28 msec period. The sampled data are stored in a digital form in RAM memory for further signal processing.

9. System Synchronizer/Controller 40—Its function is to synchronize the three control components described above. A total of 64 data points is taken, which can be divided into 16 sequences of 4 data points, each sequence associated with one of the 16 phase states. The sequences can therefore be designated by their phase states. (A master clock 42 sets the basic repetition rate of the voltage source 14 with its clock signals divided down by counter 44, the repetition rate for the 16 phasestates is set.)

The total acquisition time of the 64 data points is 1.28 msec. In the automotive application, where maximum relative speed between the antennas and an object does not exceed 12 inch/msec, any object can be considered essentially stationary during the acquisition period.

Focusing on the operation of two components, namely the power splitter 16 and the mixer (phase comparator), two distinct signal paths can be traced between them:

a) a reference path 28, defined by terminal points 27, 29, 31 and 32.

b) an rf path, defined by terminal points 34, 33, (the target 22) 35 and 37.

Let us assume that the r.f. path is 10 ft. longer than the reference path (the target 22 is thus at a distance of about 5 feet). In the air, the rf energy travels at the speed of $3 \times 10^8$ meters/sec, equal to about 1 ft/nsec. Thus the time it takes the signal to travel through the rf path is 10 nsec longer than the time it takes the signal to travel through the reference path. This additional time is referred to as the time delay $\tau$.

The rf signal can be described as a rotating vector with one complete rotation equivalent to one cycle. If the vector rotates only part of a cycle, then that segment of the cycle can be described in terms of a phase change, where 360° corresponds to a complete cycle.

In similar fashion the VCO signal at any given frequency can be described as a continuously rotating vector at a uniform speed, whose angular velocity is determined by the frequency of the signal. As an example, if the VCO is generating a signal at a frequency 10.5 GHz ($10.5 \times 10^9$ cycles/sec, or 10.5 cycles/nsec), then the number of revolutions per nsec is 10.5.

At the beginning of each signal path, it is assumed both the reference and the rf signals are in phase. In other words, their vectors at points 27 and 34 are aligned and they are rotating at the rate of 10.5 cycles/nsec.

Let us examine what happens to the alignment of the reference and rf vectors at the end of their respective paths (terminal points 32 and 37). Since the rf signal takes 10 nsec longer to reach the end of the path, its associated vector will have made 105 more revolutions than the reference signal (10.5 revolutions/nsec). Nevertheless, both vectors will still have a zero net phase difference between them. Since the mixer acts as a phase comparator, the output signal of the mixer, at point IF, remains at its zero phase state for as long as the frequency and the path length remain unchanged.

Now the case where the VCO frequency has been increased by 12.5 MHz, i.e., 10.5125 cycles/nsec, is considered. Consequently, in the same 10 nsec period there are 105.125 more cycles of the rf signal vector. Therefore, at points 32 and 37, the vectors are ⅛ cycle or 45° apart, and the vector of the output signal of the mixer moves from its zero state by 45°. Similarly, each time the VCO frequency is increased by 12.5 MHz, the vector of the output signal of the mixer 26 is moved by 45°.

In summary, when four frequencies are generated in the sequence $f_o$, $f_o+12.5$ MHz, $f_o+25$ MHz and $f_o+37.5$ MHz, the output vector moves through an angular (⅜ of a cycle in ⅛ increments) range of 135° in 45° increments.

It should be evident that the angular range through which the output vector swings depends on the difference between the maximum and minimum frequency of the VCO. (The number of steps in which the VCO changes from minimum to maximum frequency does not affect the angular range of the output vector, except for a small quantization error related to the frequency increment).

Based on the foregoing, the signal at the output of the mixer can be analyzed in terms of the information it may contain about the target. The angular range over which the output vector moves depends upon the delay of the rf signal (hence the target distance). Thus by measuring the angular range of the output vector, the target distance can be deduced.

However, a problem arises when two or more targets are present. For each target we can define a separate rf path and an associated rf vector. The rf vectors may have various amplitudes and will span different angular ranges, depending on the related distances. Correspondingly, each associated output vector also may have various magnitudes and will rotate at different speeds. The picture is now more complex. Since vectors are actually superimposed on each other and the resultant vector will rotate at a non-uniform speed. In fact, it will exhibit a complex motion, changing directions, and size with uneven increments each time the VCO frequency is increased by 12.5 MHz.

If, however, each vector by itself traces out one or more full cycles during the VCO frequency sweep, it is then possible to "decompose" the resultant vector into individual component vectors. This decomposition procedure is known as "fourier transformation". Provided the above condition is satisfied, from the "trace" of the composite vector we can obtain, via a fourier transformation, the number of full revolutions for each of the vector components, from which the locations of corresponding targets can be readily deduced. It should be evident that this condition applies only to targets at 10', 20', 30', etc. For any other target locations, the individual output vectors do not complete an integral number of full cycles during the VCO sweeps, and, as it turns out, their distance cannot be resolved without an ambiguity.

This condition leads to a definition of the distance resolution. Resolution is defined by a distance needed to separate two targets, such that during the time the VCO frequency changes from minimum to maximum, the output vector associated with the further target will rotate one more cycle than the vector associated with the closer target. This condition is defined mathematically as $\Delta r = c/\{2(f_{max}-f_{min})\}$, where c is the propagation velocity.

As discussed above, for a case with 4 frequencies incremented by 12.5 MHz and a target at 5 feet (corresponding to time delay of 10 nsec), the angular excursion of the output vector is ⅜ of a cycle.

The output vector will move through the full cycle, if we increase the frequency bandwidth of the VCO by factor of 2. However, this is not a desirable solution.

The basic problem to be resolved is how to "force" the output vector to complete this cycle, so that as we repeat the sequence of VCO frequencies indefinitely, the output vector rotates in a uniform and continuous manner as the VCO continues to sweep.

Figure 2:
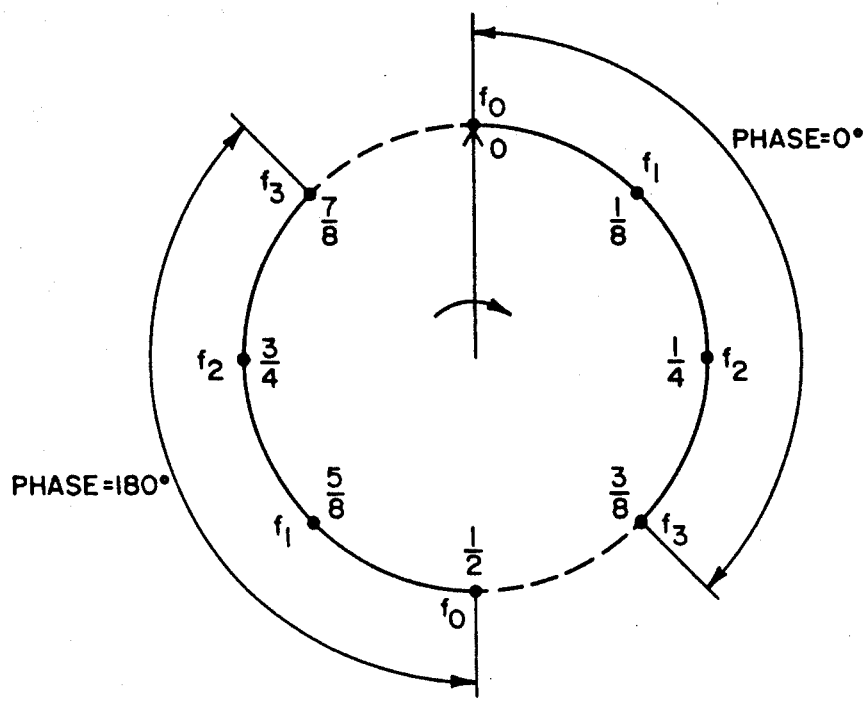
FIG. 2 is a schematic graphical diagram of rotating vectors illustrative of the operation of the system of FIG. 2.
Figure 7:
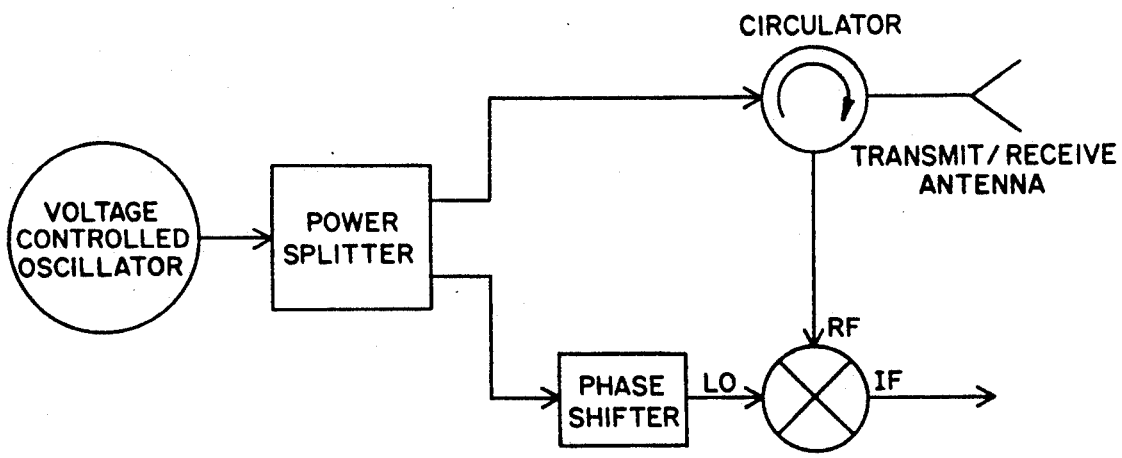
FIGS. 7, 8, and 9 are schematic block diagrams of modified forms of the invention.

Let us examine what happens when the phase shifter 30 changes the phase in the reference path. For example, if that phase change is 180°, then the phase difference between the rf and reference signals at the mixer, signals at points 32 and 37, changes by 180° and the position of the output vector shifts by a ½ cycle. Some phase-shift occurs at each of the VCO frequencies. Correspondingly the angular range of the output vector will again be ⅜ of the cycle, but beginning at the ½ cycle point. See FIG. 2 for a graphical illustration.

Therefore, as we continuously repeat the VCO sequence of 4 frequencies and change the phase by 180° during alternate segments, the output vector will rotate uniformly and continuously.

Since we have the required condition of a uniformly and continuously rotating vector, the principle of vector decomposition, i.e., the fourier transformation, can be applied to deduce the target distance even in the presence of other targets.

To summarize this new case, let us define a phase sequence as two successive frequency sweeps. There are two possible phase sequence arrangements. (There will be a total of 8 data points, each associated with a given phase and frequency.) In the first arrangement, the phase remains zero in both frequency sweeps, while in the second the phase increases by 180. In the former instance, only the targets at 10', 20', 30', etc. cause the associated output vectors to rotate 2, 4, 6, etc. complete revolutions per phase sequence. Analogously in the the instance, only the targets at 5', 15', 25' etc. cause the associated output vectors to rotate 1, 3, 5, etc. complete revolutions per phase sequence.

Therefore, I have developed a method by which the apparatus is able to resolve a target with 5' accuracy or a factor-of-two improvements. The trade-off is that the apparatus needs to measure and analyze twice as much data.

The above method can be extended for a larger number of phase steps, resulting in an additional improvement. In general, the improvement factor is equal to the number of phase steps. If $n_p$ is the number of steps, then the range accuracy is $$\Delta r = c / \{2 n_p (f_{max} - f_{min})\}$$

For an example, in the present embodiment the number of phase states is 16. A phase sequence consists of 16 frequency sweeps. There are total of 16 phase states in the sequence arrangement. Let us designate each of them (0), (1), (2), ..., (9), (A), (B), ..., (F) (using hexadecimal notation). For instance, in the sequence-0 the phase increment for each successive frequency sweep is zero, as the output data are measured. For sequences −1, −2, and −3 the increments are 22.5°, 45°, and 67.5°, respectively and so on. Each of the corresponding data sequence must be analyzed for different set of target locations, which will cause the output vectors to rotate one or more full revolutions per sequence. Table 1 below demonstrates this example.

TABLE 1

| Sequence designation | Phase increment | Targets with complete cycles | No. of cycles |
|---|---|---|---|
| −0 | 0° | 0',10',20',etc. | 0,16,32 etc. |
| −1 | 22.5° | .626',10.625'etc. | 1,17,33 etc. |
| −2 | 45° | 1.25',11.25'etc. | 2,18,34 etc. |
| . . | . | . | . |
| . | . | . | . |
| −4 | 90° | 2.5',12.5',etc. | 4,20,36 etc. |
| . | . | . | . |
| . | . | . | . |

TABLE 1-continued

| Sequence designation | Phase increment | Targets with complete cycles | No. of cycles |
|---|---|---|---|
| −8 | 180° | 5',15',etc. | 8,24,40 etc. |
| . | . | . | . |
| . | . | . | . |
| −F | 337.5° | 9.375',19.375'etc. | 15,31,47 etc. |

DIGITAL PROCESSING

Figures 3, 4, 5:
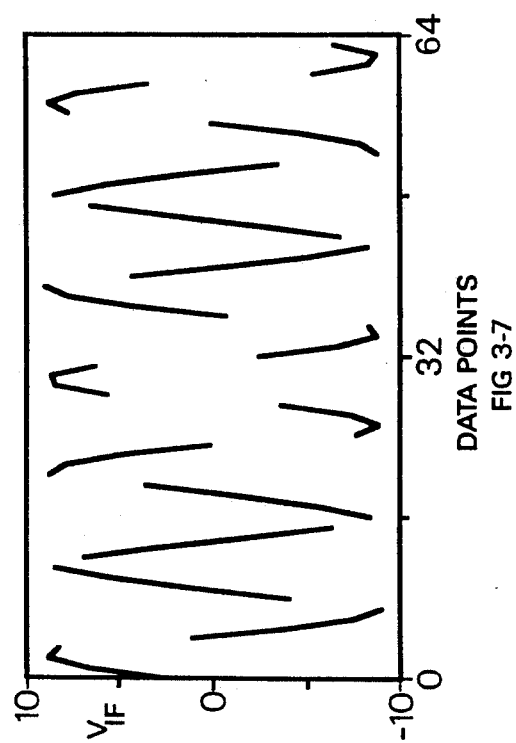
FIG. 5 is a graphical diagram of a table of data illustrating the operation of the distance calculator of FIG. 1.
Figure 4A:
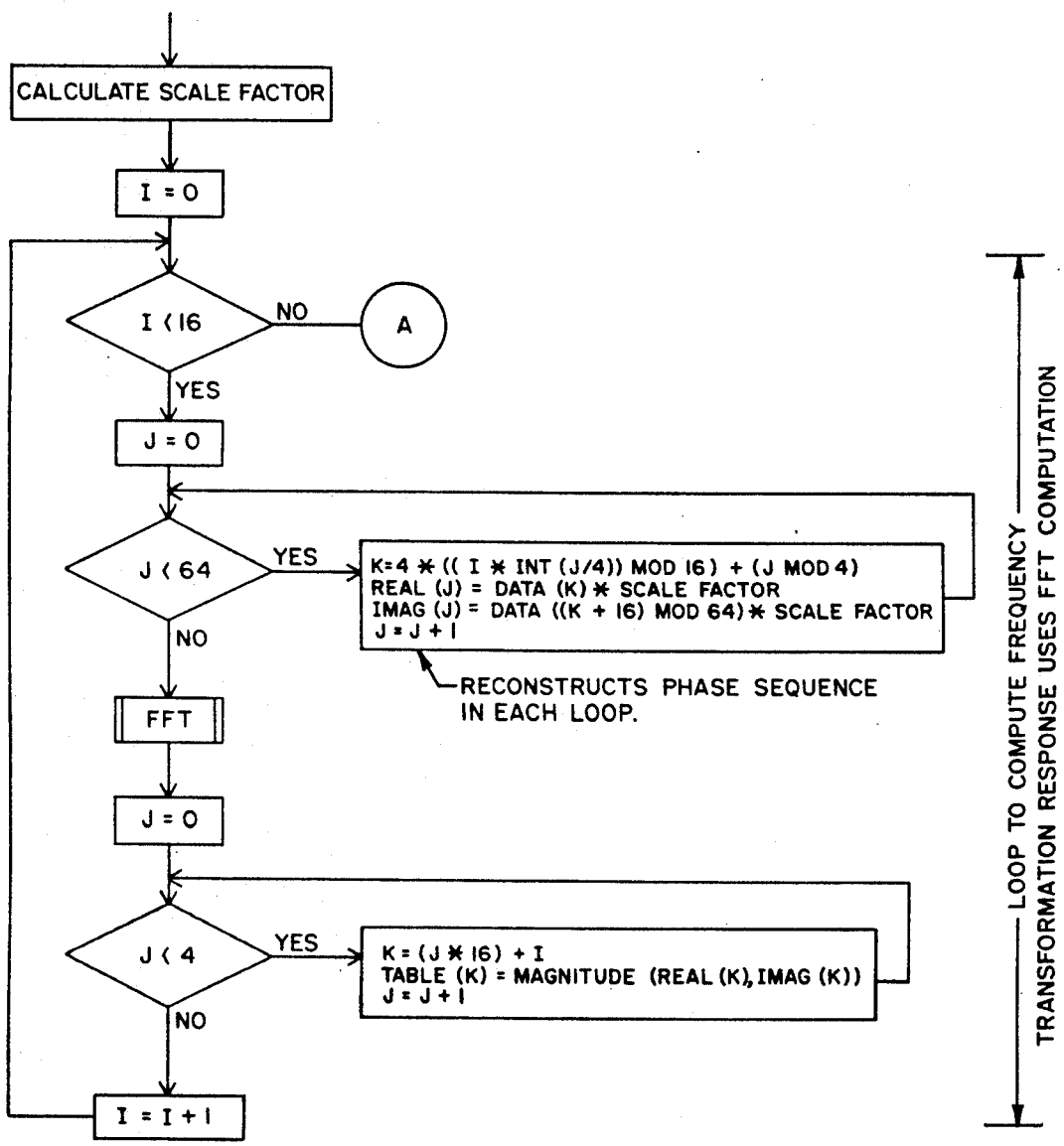
FIGS. 4A and 4B are computer flow charts of the data processing performed including the frequency transformation and distance calculator.

1. The fast fourier transform (FFT) processes the data digitally. The measured data are samples of the signal produced at the output port 39 of the mixer 26. One data sample is acquired for each frequency and phase state. There are total of 4 frequencies and 16 phase state, or 64 points which are stored in a 1-dimensional array. DATA (I), I=0, ..., 63. As can be deduced from Table 1 above, the phase sequence-1, generates all 64 combination of frequencies and phases. Therefore, this sequence-1 is the only one performed during the measurements. The other sequences are then reconstructed in the computer processing. FIG. 4a shows the flow chart which computes the frequency transformation response of FIG. 5. As each of the phase sequences is reconstructed, the fourier transform FFT is applied; only 4 points from the 64 FFT-output points are required. These are indicated in the 4th column in Table 1 (above). These 4 points are stored in an array TABLE (k), k=0, ..., 63 (FIG. 5). After 16 repetitions of the main loop, output array TABLE (k) is filled; a typical plot of TABLE (k) array is shown in FIG. 5, where the magnitude of each data point is shown.

Figure 4B:
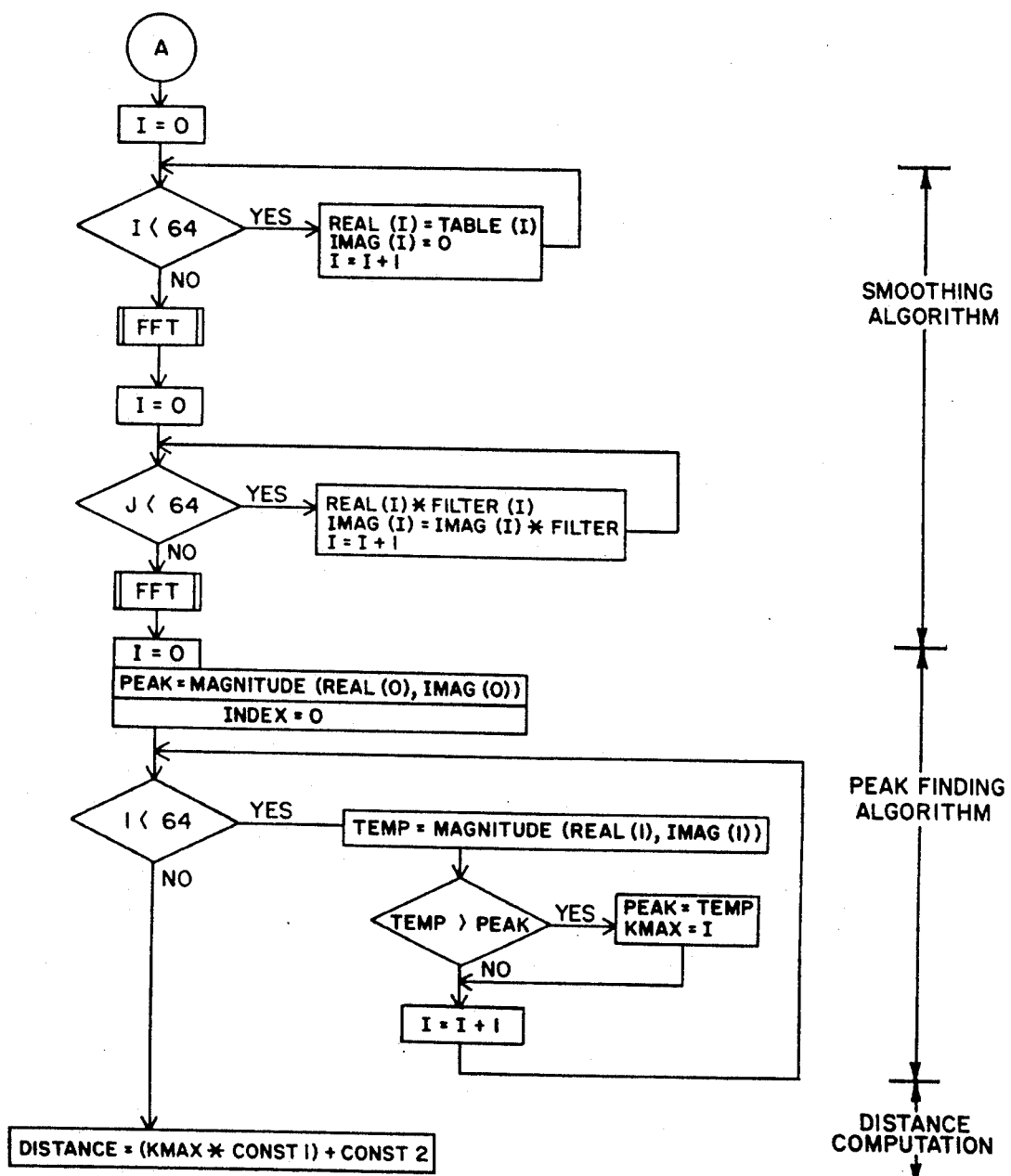
Figure 5:
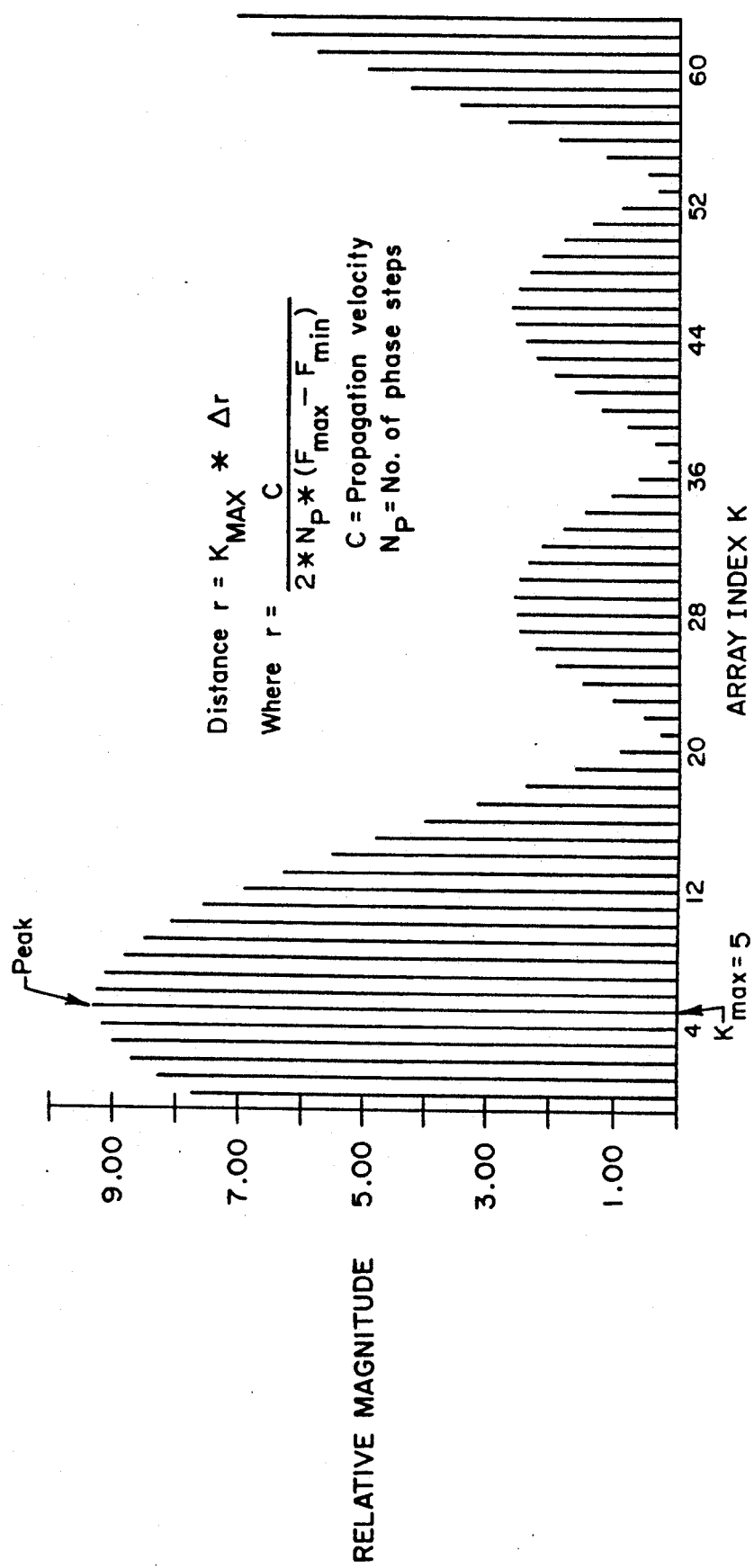
Figure 8:
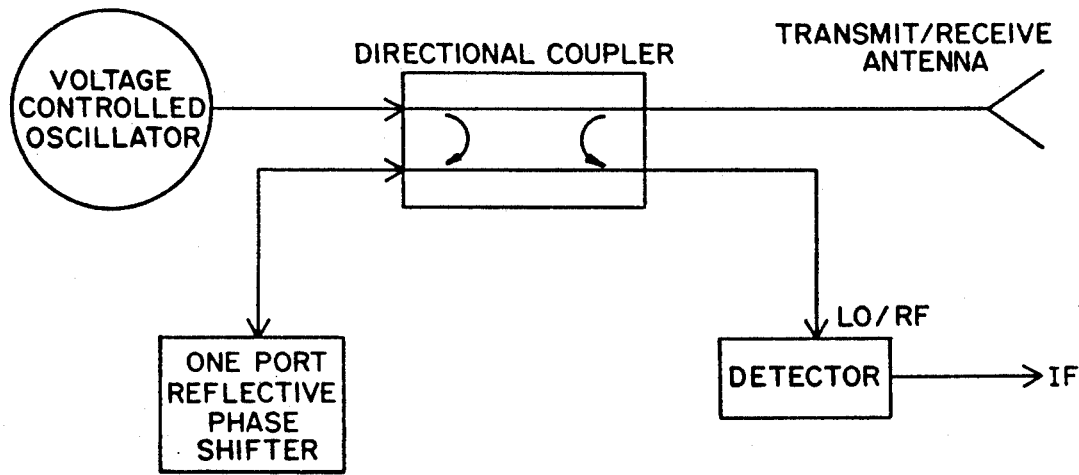
Figure 9:
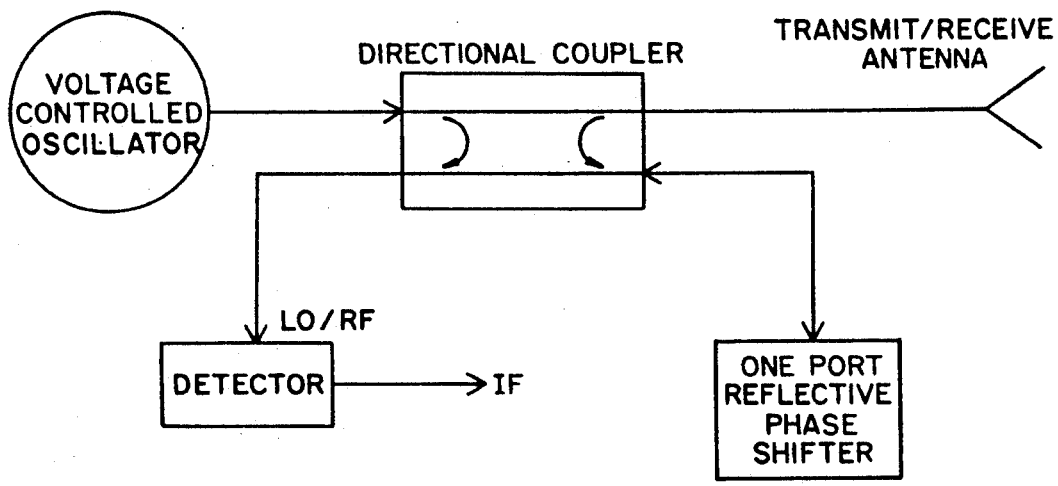
Figure 10:
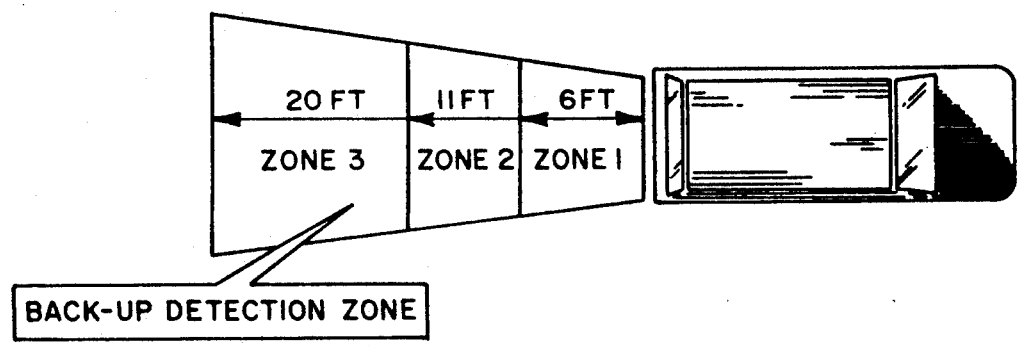
FIG. 10 is a schematic diagram showing zones in which targets subject to monitoring are located in relation to an over-the-road vehicle.

2. Smoothing. The magnitude of the rf signal received at the antenna can have a large variation, depending on the reflection of the target and its distance. For weak rf signals, a random interference may be superimposed on the measured data and the computed curve may not be as smooth as one shown in FIG. 5. It will have narrow spikes resulting in the "false" peaks. It is therefore necessary to "smooth" the data stored in the array TABLE (k) of FIG. 5 by applying a smoothing algorithm, which is indicated in the flow chart in FIG. 4B. The smoothing algorithm is based on widely known work (by R. B. Blackman and J. W. Turkey, "The Measurement of Power Spectra", Dover, 1958) using FFT routines. Finally, a peak finding algorithm is performed to determine index kmax at which the peak of the frequency transformation occurs. Finally, the target distance is computed; a suitable formula is set forth below (see Appendix, equation 16).

In a present embodiment of the system, the number of phase states $n_p=16$. For each of the phase states the voltage controlled oscillator generates four frequencies $f_o$, $f_o+df$, $f_o+2df$, $f_o+3df$, where $f_o=10.5$ GHz and $df=12.5$ MHz. Each time a new frequency is generated, a voltage at the IF part of the mixer is digitally sampled (measured) and stored in the computer's RAM memory; a total of 64 measured data points are sampled and stored. FIG. 3 is a set of 16 graphs (numbered 0 to F) each formed of the real portion of the 16 corresponding phase sequences developed in the reconstruction processing loop of the calculations process of FIG. 4A.

A typical example of a set of 64 data points is shown in FIG. 3a, graph (1). The graph is divided into 16 segments. Each segment represents a subset of 4 data points, (connected for clarity by a continuous curve).

Therefore, the first segment of the graph is a measured response at 4 frequencies when phase shifter is in state 0°. The second sequence is another response at the same 4 frequencies when phase-shifter is in state 22.5°.

Each subsequent segment corresponds to a response for 4 frequencies ($f_o$, $f_o+df$, $f_o+2df$, and $f_o+3df$), as phase is increased by 22.5°. The complete wave form is a set of 16 segments and is designated as a phase sequence-1. The number of the sequence conveniently designates that in this phase sequence, the phase state between subsequent segments is increased by one least significant bit LSB (22.5°). Other 15 phase sequences as shown in FIGS. 3a and 3b are computer reconstructed from data contained in the phase sequence-1. Again, the phase sequence-0 to -F refer to LSB increments of the phaseshift between subsequent segments.

The target range can be visually obtained by examining the 16 graphs for the sinusoidally continuous response and counting the number of full sinusoidal cycles. In this example phase sequence-5 meets the criteria with 5 complete cycles. This number of complete cycles directly relates to the target range and is used for visual analysis of graphs. Machine processing via FFT (FIG. 4a) performs a similar analysis.

A computer efficient method is to apply FFT to each of the 16 wave forms (phase sequences). FFT produces 64 complete data output points. FFT output of phase sequence-1 produces data for 1, 17, 33 and 49 etc. according to Table 1.

The resultant set of 64 points produces a curve as shown in FIG. 5. The position of the peak is related to the target distance.

The voltage controlled oscillator can generate either a continuous range or a discrete set of frequencies. In the former arrangement, the system can measure obstacle range from zero to infinity, being limited only by the strength of the echo signal.

The advantage of the latter case is that the system can be made significantly simpler and therefore cheaper. However, because of the finite number of frequency steps, the range measurement has an unambiguity range $$R_u = c \cdot n_f / 2\Delta f_m)$$

In the present embodiment, where the number of frequencies is four and the bandwidth is 50 MHz, the unambiguous range is 40 feet. To overcome this ambiguity problem, the system operates in two modes. In one of the modes, so called far-looking mode, the modulation bandwidth is 12.5MHz, resulting in 160 feet of unambiguous range. It is reasonable to expect that an echo signal from an obstacle past 160 feet will be always negligible.

The resolution in this far-looking mode is 2.5 feet only. If a target is detected within 20 feet, the system switches to the near-range high resolution mode, using a modulating bandwidth of 50 MHz with a resolution of 0.625 feet. In both of these modes the number of generating frequencies is only four.

The foregoing describes a new and improved near range obstacle detection and ranging aid. The invention improves on existing technology to provide a sufficiently high resolution of targets without requiring an increase in bandwidth beyond what is presently available. In addition multiple targets can be identified.

Applicant has disclosed various forms and modifications of the invention and others will be apparent to those skilled in art from the concepts set forth above and in the following claims. Applicant does not intend to be limited in the scope of his invention except as set forth in the claims themselves.

The attached Appendix sets forth theoretical bases for this invention and is incorporated herein as a part of the application.

Appendix

Narrow-band Radar System with Improved Range Resolution

Overview

The specific problem addressed in a particular automotive application has been to measure range of a target, (or the closest one in a multi-target environment), with less than one foot resolution over a 0 to 20 feet range. Among the various approaches considered, a microwave FM-CW radar has been chosen. It is a mature technology with low cost attributes, adequately suited for the automotive environment and offers many advantages compared to ultrasonic, infra-red or optical techniques. The principles limitation encountered in this approach stems from the restricted operating bandwidth allowed by the FCC for unlicensed radar transmission [1]. At the preferred operating band, nominally at 10.525 GHz, bandwidth is 50 MHz.

It is known, [2], that the inherent range resolution $\Delta r$, is directly related to the radar bandwidth $\Delta f_m$, i.e.

$$\Delta r \approx \frac{c}{2 \times \Delta f_m} \quad (1)$$

where c is the velocity of propagation, which for electromagnetic energy approximately equals to one ft/nsec in free space. This is also referred to as the critical distance problem [3].

Thus, for $\Delta f_m = 50$ MHz bandwidth, the inherent resolution according to (1) is $\Delta r \approx 10$ feet.

In the most broad sense, the key aspect of FM-CW system is measurement of a relative time delay between two coherent frequency-modulated signals. Improved resolution can be achieved by phase modulating, over repeated cycles of frequency modulation, one of the two signals. In so doing, additional time is needed to acquire complete data under all phase conditions. This is an example of the classic time/bandwidth trade-off.

Figure 11:
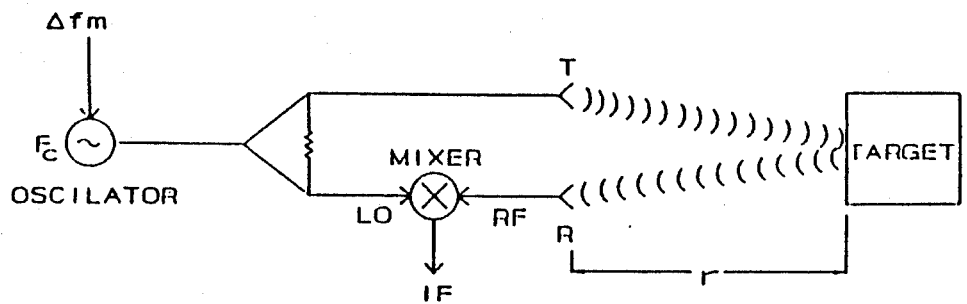
FIG. 11 is a schematic block diagram showing a typical frequency modulated-continuous wave (FM-CW) radar system.

A typical FM-CW system is shown in FIG. 11. The LO signal, having a frequency Fc, is frequency modulated over a bandwidth $\Delta f_m$. Assuming linearly swept modulation, the instantaneous frequency varies between Fc and Fc+$\Delta f$, B, over the finite swept period T starting at some arbitrary time, as shown in eqn. (2).

$$\omega(t) = \omega_c + \Delta\omega \frac{t}{T} \quad 0 \leq t \leq T \quad (2)$$

The parameter of interest is the electrical phase of the oscillator signal $\theta_{10}$, shown in eqn. (3) which includes an arbitrary phase $\psi$.

$$\theta_{LO}(t) = \int_0^t \omega(t)dt = \omega_c t + \frac{1}{2}\Delta\omega_m \frac{t^2}{T} + \psi_0 \quad (3)$$

where $\omega_c = 2\pi F_c$ and $\Delta\omega_m = 2\pi\Delta f_m$

The oscillator signal is split into two parts, for example by means of a power divider as shown in FIG. 11. These signal are then guided through a reference and a transmission paths respectively. Referring to FIG. 1, the former is a distance between the power splitter and a LO port of the mixer, while the latter is a distance between the power splitter and the RF port of the mixer. In FIG. 11, the transmission path includes a distance 2r, the distance between the transmitting and receiving antennas via the target.

Without the loss of generality, we can treat the problem by assuming that all distances, except the distance 2r, are zero. Therefore it follows that the phase of the reference signal at the LO port of the mixer is also given by eqn (3).

The transmitted part of the oscillator signal which travels a distance 2r, is received with a delay $r=2r/c$. Thus the phase of the signal at the RF port of the mixer, $\theta_{RF}$, is related to the phase of the signal at the LO port by eqn (4).

$$\theta_{RF}(t) = \theta_{LO}(t-\tau) \qquad (4)$$

The function of the mixer in FIG. 11 can be characterized as phase comparison. Thus, if the LO and RF signals are sinusoidal waveforms with constant amplitude, then the waveform at the IF port is also a sinusoidal function whose phase $\theta_{IF}$ equal to the difference between phases of the LO and RF signals, or $$\theta_{IF}(t) = \psi_1 + \Delta\omega\tau \frac{t}{T} \quad 0 \leq t \leq T \qquad (5)$$

where $\psi_1$ is a time independent constant phase and the second term represents the IF frequency term proportional to the delay $r=2r/c$.

Some observations about the nature of the IF signal:
1. The IF signal is a periodic function.
2. Therefore all the available data can be acquired over the period T.
3. Evidently, in the single target case, the delay $\tau$ can be measured directly from the phase response, by determining the total phase change between the beginning and the end of the sweep period T. The measured resolution would be limited only by the capability of a phase discriminator employed. However, in a multiple target situation, the direct phase measurement produces large errors.
4. If the product $\Delta f_m \tau$ is an integer, the IF output will be a continuous sinewave. Otherwise it will be a repetitive discontinuous rain of sinewave segments. In the former case, the output phase is swept over a full $2\pi n$ range. In the latter case, at least one phase cycle is incomplete. It is evident from (5) that the phase constant $\psi_I$ defines which part of the $2\pi$ cycle remains incomplete.
5. In the frequency domain, the IF signal, as a consequence of the paragraph 1, above, is a discrete function with its harmonic components being 1/T apart.
6. For each harmonic there is a corresponding discrete location of a target with a delay $\tau_k = k/\Delta f_m$, where $k=0,1,2\ldots$ is the appropriate harmonic number.
7. If k in above is not an integer than the frequency domain response to such a target will be two or more harmonics.
8. It follows, that the resolution is limited by condition $\Delta f_m \tau = 1$, which confirms eqn (1).

Modified FM-CW Approach

Figure 12:
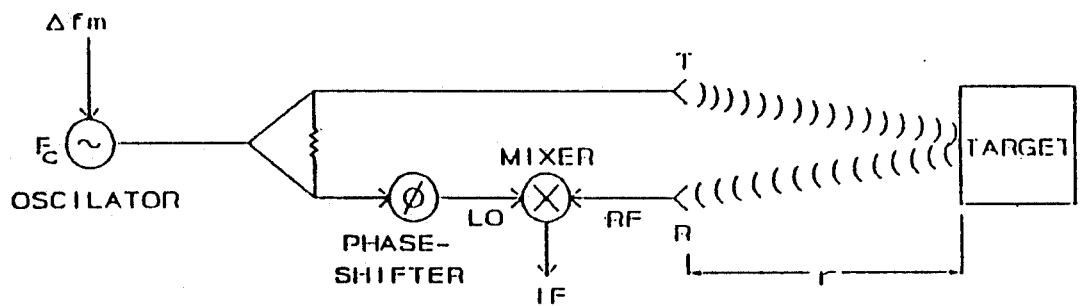
FIG. 12 is a schematic block diagram showing a modified frequency modulated-continuous wave (FM-CW) radar system.

The key aspect in the modified FM-CW system is the inclusion of a variable $2\pi$ phase-shifter in one of the two signal paths, stepping through $n_p$ discrete phase states over repeating cycles of frequency modulation. The phase of the phase-shifter $\psi_{LO}(t)$ has a time varying nature with a period $n_p T$, since the period of the frequency modulation cycle is T. In FIG. 12, the phase-shifter is shown as being in the reference path. It can be readily shown that the phase of the IF signal is similar to that of eqn. (5), except it includes phase $\psi_{LO}(t)$ of the phase-shifter, i.e.

$$\theta_{IF}(t) = \psi_1 + \psi_{LO}(t) + \Delta\omega\tau \frac{t}{T} \qquad (6)$$

For each sweep period T, the phase at the LO port is changed in $n_P$ steps.

Several observations can be made:
1. The IF signal has now period $n_P T$.
2. It follows that in the frequency domain the discrete frequencies are separated by $1/n_P T$.
3. Thus the necessary condition for improved resolution exist.
4. The range resolution is given by $$\Delta r = \frac{c}{2 \times \Delta f_m \times n_p} \qquad (7)$$

For example, by using 4 bit phase-shifter, $n_P=16$, the resolution for $\Delta f_m = 50$ MHz would be, according to (7), 0.625 ft.

Digital Signal Processing

In this approach the IF signal is sampled with $n_f$ samples per frequency sweep. Consequently the frequency modulation cycle of the oscilator can have $n_f$ discrete frequencies. However, because of the finite number of frequency steps, the range measurement has an unambiguity range $R_m$, readily shown to be $$R_u = \frac{cn_f}{2\Delta f_m} \qquad (8)$$

With $n_P$ phase states per each frequency sweep, the total number of acquired data over a period $n_P T$ is $$n = n_p \times n_f \qquad (9)$$

Each of the n data have an unique pair of frequency and phase indexes $i_P$ and $i_f$. These data are designated as $v(i_p, i_f)$. Let us define a transformation of $v(i_p, i_f)$ as follows $$Z(k) = \sum_{i_p=0}^{n_p-1} W^{n_f i_p k} \sum_{i_f=0}^{n_f-1} W^{-i_f k}\{v(i_p k, i_f) + jv(i_p k + n_p/4, i_f)\} \qquad (10)$$

$$\text{where } W = e^{-j\frac{2\pi}{n_p n_f}}$$

$v(i_p, i_f)$ $i_p=0,1,\ldots n_p-1$ and $i_f=0,1\ldots n_f-1$ ($n_p n_f$ total), is a set of acquired data points, defined to be periodic, eqn. (11).

$$v(i_p + m n_p, i_f) = v(i_p, i_f) \text{ for m = any integer} \qquad (11)$$

It can be shown that for a single target the magnitude of the transformation, shown in equation (10) leads to a $\sin(x)/x$ response an alternative form of equation (10) can be obtained by defining a new index i.

$$i = i_p n_f + i_f \tag{12}$$

Then equation (10) reduces to $$Z(k) \sum_{i=0}^{n-1} W^{ik} u(i) \tag{13}$$

where $u(i) = v(i_p k, i_f) + jv(i_p k + n_p/4, i_f)$

Note that $u(i+mn) = u(i)$ for $m =$ any integer.

Range Determination

Let $k_{max}$ be an index number of the $Z(k)$ transformation such that $$|Z(k_{max})| = \max|Z(k)| \text{ for } 0 \leq k \leq n-1 \tag{14}$$

In other words, $k_{max}$ is the index of the complex array $Z(k)$, for which the magnitude of $Z(k)$ is maximum. Then the time delay $\tau = 2r/c$ is related to the index $k_{max}$ by equation (15)

$$\tau = k_{max} \Delta r \frac{k_{max}}{\Delta f_n n_p} \tag{15}$$

Cable Correction

In practice the distance of the reference path contains cable or similar transmitting media of a known time delay $t_{ref}$. Similarly, the transmission path include cables between power splitter and transmitting antenna, as well as between receiving antenna and the RF port of the mixer, having known time delays $\tau_a$ and $\tau_b$. It follows that $$r = k_{max} \text{const1} + \text{const2} \tag{16}$$

where $\text{const1} = \frac{c}{\Delta f_m n_p}$ and $\text{const2} = c(\tau_{ref} - \tau_1 - \tau_2)$

Leakage Correction

In a practical system one or more leakage paths may exists between the RF and LO ports of the mixer. When measuring a target with a weak echo signal, a stronger leakage signal may cause significant errors. Since the transformation (13) has a commutative property, we can generate a corrected signal $u_{corr}(i) = u(i) - u_{cal}(i)$, which is to be used in equation (13). The signal $u_{cal}(i)$ is measured when no targets are present. Alternatively, we can measure $u_{cal}(i)$ even in the presence of targets, if both antennas are replaced by a matched load. In this case, however, the external leakage between the antennas cannot be corrected and therefore will limit the useful dynamic range of the target echo.

Multiple Targets

Let us assume that total of L targets are present. We have a L transmitting paths of different length. Due to each transmitting path there is a associated signal $v_1(i)$ and transform the $Z_1(k)$ for each target $l = 1, 2, \ldots L$. It is readily seen from the commutative properties of (10) or (13) that the combined effect of all targets results in transform $Z(k)$ such that $$Z(k) = \sum_{l=1}^{L} Z_l(k) \sum_{l=0}^{n-1} W^{ik} \sum_{l=1}^{L} u(i) \tag{17}$$

Since each transformation $Z_1(k)$ is a $\sin(x)/x$ function, the combined transform is a summation of L such function having maxima shifted with respect to each other with varying magnitudes of the maxima. Some analysis as well as experimental measurements indicate several aspects:

1. Targets which produce about equal signal at the receiving antenna and are separated by several units of $\Delta r$, the measured range will be a average of two target distances.
2. Targets which produce unequal signals at the receiving antenna and are separated by several units of $\Delta r$, the measured range will be a distance corresponding to a distance of the stronger target.
3. Targets which produce about equal signals at the receiving antenna and are separated by many units of $\Delta r$, the range of both targets can be obtained from the measurements.
4. Targets which produce unequal signals at the receiving antenna and are separated by many units of $\Delta r$, the range of the stronger targets is obtained accurately. The discrimination of the weaker target is possible, provided a magnitude of its signal is within 10 dB of the stronger signal.

In a particular automotive environment, we are always interested in a closest target. Since signal strength decreases 12 dB each time the target distance is doubled, we directly benefit from range discrimination of further targets.

[1] FCC section 15 ...

[2] D. Wiener, "High Resolution Radars", Artech House 1987, p. 5.

[3] Skolnik, "Radar Book" 1972, p. 17

What is claimed is:

1. Range detection apparatus comprising:
   (a) means for generating high frequency energy over a finite frequency range and for frequency modulating over a limited range of bandwidth said high frequency energy and for supplying said frequency-modulated high frequency energy to a first electrical path providing a phase reference,
   (b) a second electrical path for transmission and receiving and including means for radiating said frequency modulated high frequency energy into space in the form of propagating waves and for receiving a portion of said radiated energy after reflection from a remote object, said energy portion acquiring a phase shift related to the distance traveled by said radiated energy and to the frequency of said radiated energy,
   (c) means in one of said paths for phase shifting said frequency-modulated high frequency energy at a plurality of predetermined frequency values over a finite frequency range of said bandwidth and at a predetermined plurality of phase-shifting values having a certain quantity greater than two, and at combinations of said phase-shifting and said frequency values to improve by a factor of said certain quantity the relative range resolution attainable with said limited range of bandwidth,
   (d) and means for comparing the phase of said frequency-modulation energy in one of said paths with the phase of said reflected and received radiated energy in the other of said paths to produce range measurement signals related to the combined phase shifts of said two paths and in accordance with said signals produced by said phase comparing means, and with the combinations of phase states of said phase shifter and the frequencies of said energy generating means, (e) and means for deriving range measurement information from all of said phase-shifting and said frequency values.

2. Range detection apparatus as recited in claim 1, wherein said means for phase shifting is in said reference path and operates to phase shift said frequency-modulated high frequency energy supplied thereto and in turn to supply the phase-shifted frequency-modulated energy to said means for phase comparing.

3. Range detection apparatus as recited in claim 2, wherein said means for phase shifting is in said second path and operated to phase shift frequency-modulated high frequency energy supplied thereto.

4. Range detection apparatus as recited in claim 1, wherein said means for generating high frequency energy and for frequency modulating includes means for generating and frequency modulating a continuous set of frequencies.

5. Range detection apparatus as recited in claim 1, wherein said means for generating and for frequency modulating includes means for generating and frequency modulating a set of discrete frequencies.

6. Range detection apparatus as recited in claim 1, wherein said means for deriving range measurement information from all of said phase-shifting and frequency values includes:

(f) means for sampling and digitizing said range measurement signals, and computer means for storing the digitized signals, and for processing the information of said sampled, digitized and stored range measurement signals in association with the corresponding phase-shifting and frequency values to produce an indication of range measurement.

7. Range detection apparatus as recited in claim 6 wherein said phase-shifting values are equally spaced over 360 degrees and in a certain configuration over repeated cycles of said frequency modulation and employing all combinations of said phase-shifting and said frequency values.

8. Range detection apparatus as recited in claim 6, wherein said means for producing range measurement signals includes means for transforming the signals produced by said phase comparing means from the time domain to the frequency domain.

9. Range detection apparatus as recited in claim 8 and further comprising a display representing a configuration of range areas, and wherein said means for generating a range measurement signal includes means for determining in which of the areas a detected remote object is located, and for actuating said display to so indicate.

10. Range detecting means as recited in claim 8, wherein said means for producing range measurement signals further includes means for generating a signal distribution of power spectrum density for certain phase and frequency combinations of range measurement data, and peak finding means for producing a range measurement from the maximum of the distribution.

* * * * *

UNITED STATES PATENT AND TRADEMARK OFFICE
CERTIFICATE OF CORRECTION

PATENT NO. : 5,134,411
DATED : July 28, 1992
INVENTOR(S) : Zdenek Adler It is certified that error appears in the above-identified patent and that said Letters Patent is hereby corrected as shown below:

IN THE ABSTRACT

At line 17, delete "shifts" and insert therefor -- shifter --.

At column 1, line 10, delete "systems infrared" and insert therefor -- systems, infrared --.

At column 1, line 14, delete "of the microwave" and insert therefor -- of microwave --.

At column 1, line 20, delete "The assigned microwave" and insert therefor -- An assigned microwave --.

At column 1, line 29, delete "achieve an adequate" and insert therefor -- achieve adequate --.

At column 1, line 32, delete "a limited bandwidth" and insert therefor -- 50 MHz bandwidth --.

At column 1, line 33, delete "or even 0 feet" and insert therefor -- or even 0.5 feet --.

At column 2, line 17, delete "modulated means" and insert therefor -- modulating means --.

At column 2, line 23, delete "fourier" and insert therefor -- Fourier --.

UNITED STATES PATENT AND TRADEMARK OFFICE
CERTIFICATE OF CORRECTION

PATENT NO. : 5,134,411

DATED : July 28, 1992

INVENTOR(S) : Zdenek Adler

It is certified that error appears in the above-identified patent and that said Letters Patent is hereby corrected as shown below:

Column 4, line 20, delete "b is" and insert therefor -- where $b$ is --.

At column 4, line 26, delete "+a" and insert therefor -- $+a$ --.

At column 4, line 27, delete "-a" and insert therefor -- $-a$ --.

At column 4, line 28, delete "+a and -a" and insert therefor -- $+a$ and $-a$ --.

At column 4, line 53, delete "0.08 msec sec," and insert therefor -- 0.08 msec, --.

At column 5, line 4, delete "counter 44, the repetition rate for the 16 phasestates is set.)" and insert therefor -- counter 44 which sets the repetition rate for the 16 phase states). --.

At column 5, line 9, delete "not exceed 12 inch/msec" and insert therefor -- not normally exceed 0.1 foot/msec --.

At column 5, line 21, delete "In the air" and insert therefor -- In air --.

At column 5, line 33, delete "uniforn" and insert therefor -- uniform --.

UNITED STATES PATENT AND TRADEMARK OFFICE
CERTIFICATE OF CORRECTION

PATENT NO. : 5,134,411

DATED : July 28, 1992

INVENTOR(S) : Zdenek Adler

It is certified that error appears in the above-identified patent and that said Letters Patent is hereby corrected as shown below:

At column 7, line 41, delete "$(f_max - f_min)$" and insert therefor -- $(f_{max} - f_{min})$ --.

At column 7, line 46, delete "arrangement. Let us designate each of them (0), (1), (2),..., (9), (A), (B),..., (F)" and insert therefor -- arrangement, designated -0 through -F --.

At column 7, line 52, delete "respectively and so on" and insert therefor -- respectively, and so on --.

At column 7, line 53, delete "analyzed for different" and insert therefor -- analyzed for a different --.

At column 8, line 17, delete "phase state" and insert therefor -- phase states --.

At column 8, line 27, delete "fourier" and insert therefor -- Fourier --.

At column 8, line 28, delete "points from the" and insert therefor -- points of the --.

At column 8, line 31, delete "(FIG. 5)" and insert therefor -- (FIG. 4A) --.

At column 8, line 38, delete "a".

At column 8, line 43, delete "FIG. 5" and insert therefor -- FIG. 4A --.

UNITED STATES PATENT AND TRADEMARK OFFICE
CERTIFICATE OF CORRECTION

PATENT NO. : 5,134,411

DATED : July 28, 1992

INVENTOR(S) : Zdenek Adler

It is certified that error appears in the above-identified patent and that said Letters Patent is hereby corrected as shown below:

At column 9, line 52, delete "negligible" and insert therefor -- negligible compared to the signal received from an obstacle within the initial 20 foot range --. At column 9, line 53, delete "2.5 feet only" and insert therefor -- 2.5 feet --.

At column 10, line 13, delete "to measure range" and insert therefor -- to measure the range --.

At column 10, line 21, delete "principles" and insert therefor -- principle --.

At column 10, line 26, delete "10.525 GHz, bandwidth is 50 MHz" and insert therefor -- 10.525 GHz, the allowable bandwidth is 50 MHz --.

At column 10, line 40, delete "is measurement" and insert therefor -- is the measurement --.

At column 10, line 48, delete "frequency Fc" and insert therefor --frequency $F_c$ --.

At column 10, line 51, delete "Fc and Fc + $\Delta$f, B" and insert therefor -- $F_c$ and $F_c + \Delta f_m$ --.

At column 10, line 52, delete "in eqn. (2)." and insert therefor -- in eqn. (2), as follows: --.

UNITED STATES PATENT AND TRADEMARK OFFICE
CERTIFICATE OF CORRECTION

PATENT NO. : 5,134,411
DATED : July 28, 1992
INVENTOR(S) : Zdenek Adler It is certified that error appears in the above-identified patent and that said Letters Patent is hereby corrected as shown below:

At column 11, line 32, delete "delay r = 2r/c" and insert therefor -- delay $\tau$ = 2r/c --.

At column 11, line 47, delete "discontinuous rain" and insert therefor -- discontinuous train --.

At column 11, line 51, delete "$\Psi_l$" and insert therefor -- $\Psi_1$ --.

At column 11, line 59, delete "If k in above is not an integer than" and insert therefor -- If k in the above is not an integer, then --.  At column 11, line 62, delete "limited by condition" and insert therefor -- limited by the condition --.

At column 11, line 63, delete "eqn (1)" and insert therefor -- eqn. (1) --.

At column 12, line 16, delete "has now period" and insert therefor -- has a period of --.

At column 12, line 26, delete "$n_p$ = 16, the" and insert therefor -- $n_p$ = 16.  The --.

At column 12, line 27, delete "according to (7)" and insert therefor -- according to eqn. (7) --.

At column 12, line 34, delete "oscilator" and insert therefor -- oscillator --.

UNITED STATES PATENT AND TRADEMARK OFFICE
CERTIFICATE OF CORRECTION

PATENT NO. : 5,134,411

DATED : July 28, 1992

INVENTOR(S) : Zdenek Adler

It is certified that error appears in the above-identified patent and that said Letters Patent is hereby corrected as shown below:

At column 13, line 35, delete "$\tau_a$ and $\tau_b$" and insert therefor -- $\tau_1$ and $\tau_2$ --.

At column 13, line 47, delete "exists between" and insert therefor -- exist between --.

At column 13, line 50, delete "(13)" and insert therefor -- (eqn. 13) --.

At column 13, line 61, delete "assume that total of L targets are present" and insert therefor -- assume that a total of L targets is present --.

At column 13, line 62, delete "have a L transmitting" and insert therefor -- have L transmitting --.

At column 13, line 64, delete "there is a associated" and insert therefor -- there is an associated --.   At column 13, line 65, delete "transform the $Z_1(k)$" and insert therefor -- transform $Z_1(k)$ --.

At column 13, line 66, delete "(10)" and insert therefor -- (eqn. 10) --.

At column 13, line 67, delete "(13)" and insert therefor -- (eqn. 13) --.

UNITED STATES PATENT AND TRADEMARK OFFICE
CERTIFICATE OF CORRECTION

PATENT NO. : 5,134,411

DATED : July 28, 1992

INVENTOR(S) : Zdenek Adler

Figures 0, 3:
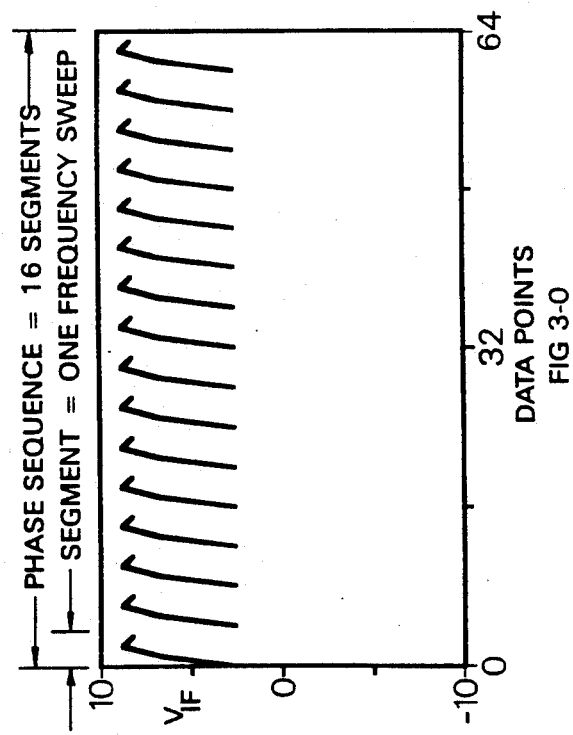
Figures 2, 3:
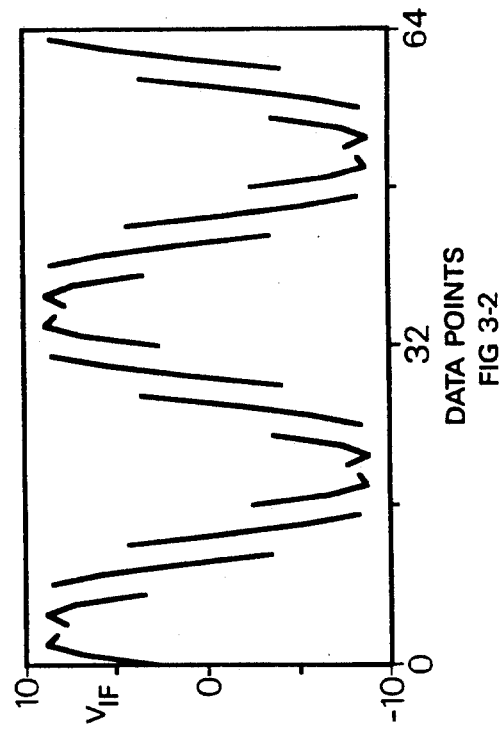
Figures 3, 4:
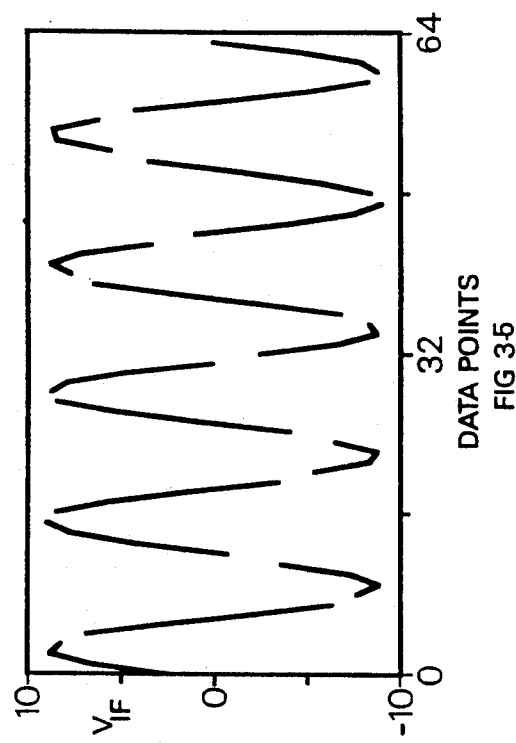
Figures 3, 4, 5, 6:
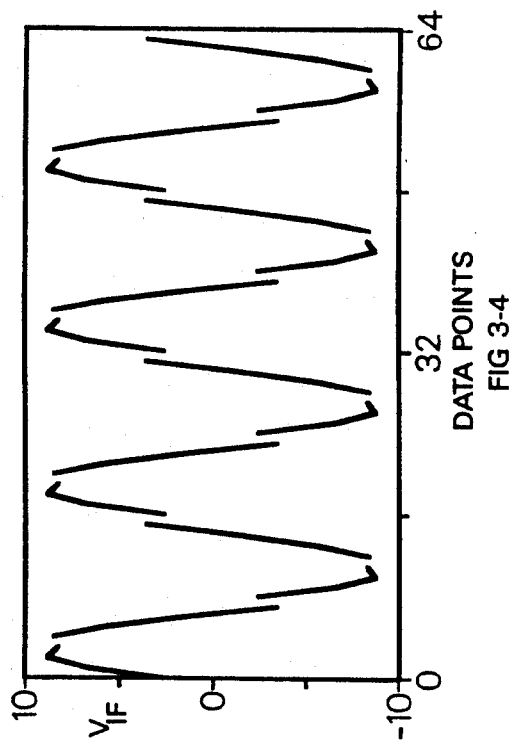
Figures 3, 4, 5, 6, 7:
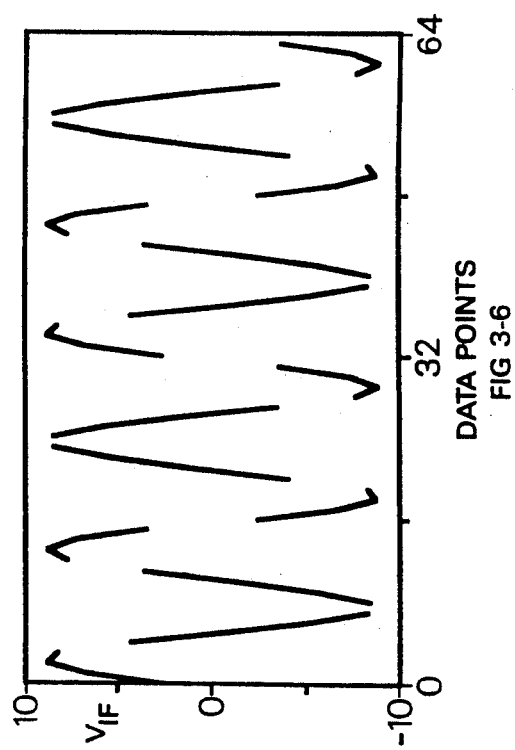

It is certified that error appears in the above-identified patent and that said Letters Patent is hereby corrected as shown below:

At column 2, line 42, delete "FIGS. 3(0) thru 3(F) are a schematic diagram of 16 graphs each (numbered hexadecimally from 0 to F in its lower left-hand corner)" and insert therefor -- Figs. 3-0 through 3-F are 16 graphs (numbered hexadecimally 0-F), schematic diagrams --.

At column 2, line 54, delete "are an idealized timing and waveform diagram" and insert therefor -- are idealized timing and waveform diagrams --.

At column 3, line 24, delete "$V_0, V_1, v_2, v_3$" and insert therefor -- $V_0, V_1, V_2, V_3$ --.

At column 3, line 26, delete "frequencies" and insert therefor -- frequency --.

At column 3, line 32, delete "frequencies are" and insert therefor -- frequency is --.

At column 3, line 42, delete "FIG. 6." and insert therefor -- FIGS. 6A through 6C. --.

At column 3, line 68, delete "points 33 and 35 should" and insert therefor -- points 33 and 35, should --.

At column 4, line 7, delete "2-port device e.g.," and insert therefor -- 2-port device, e.g. --.

At column 4, line 19, delete "where a is" and insert therefor -- where $a$ is --.

UNITED STATES PATENT AND TRADEMARK OFFICE
CERTIFICATE OF CORRECTION

PATENT NO. : 5,134,411
DATED : July 28, 1992
INVENTOR(S) : Zdenek Adler It is certified that error appears in the above-identified patent and that said Letters Patent is hereby corrected as shown below:

At column 5, line 67, delete "angular (⅜ of a cycle in ⅛ increments) range of 135° in 45° increments" and insert therefor -- angular range of 135° in 45° increments (⅜ of a cycle in ⅛ increments) --.

At column 6, line 24, delete "on each other and the resultant" and insert therefor -- on each other, the resultant --.

At column 6, line 26, delete "changing directions, and size" and insert therefor -- changing directions and size --.

At column 6, line 33, delete "fourier" and insert therefor -- Fourier --.

At column 6, line 35, delete "fourier" and insert therefor -- Fourier --.

At column 7, line 3, delete "Some" and insert therefor -- A --.

At column 7, line 14, delete "fourier" and insert therefor -- Fourier --.

At column 7, line 23, delete "increases by 180" and insert therefor -- increases by 180° --.

At column 7, line 26, delete "Analogously in the the" and insert therefor -- Analogously in the second --.

UNITED STATES PATENT AND TRADEMARK OFFICE
CERTIFICATE OF CORRECTION

PATENT NO. : 5,134,411

DATED : July 28, 1992

INVENTOR(S) : Zdenek Adler

It is certified that error appears in the above-identified patent and that said Letters Patent is hereby corrected as shown below:

At column 8, line 49, delete "kmax" and insert therefor -- $k_{max}$ --.

At column 8, line 57, delete "df-12.5 MHz." and insert therefor -- df=12.5 MHz. --.

At column 8, line 58, delete "part" and insert therefor -- port --.

At column 8, line 61, delete "FIG. 3 is" and insert therefor -- FIGS. 3-0 through 3-F are --.

At column 8, line 66, delete "FIG. 3a, graph (1)." and insert therefor -- FIG. 3-0. --.

At column 9, line 12, delete "significant bit LSB (22.5°)" and insert therefor -- significant bit, LSB, (22.5°) --.

At column 9, line 13, delete "FIGS. 3a and 3b" and insert therefor -- FIGS. 3-1 to 3-F --.

At column 9, line 28, delete "1, 17, 33 and 49 etc." and insert therefor -- 1, 17, 33, etc. --.

At column 9, line 45, delete "frequencies is" and insert therefor -- frequencies $\eta_f$ is --.

UNITED STATES PATENT AND TRADEMARK OFFICE
CERTIFICATE OF CORRECTION

PATENT NO. : 5,134,411

DATED : July 28, 1992

INVENTOR(S) : Zdenek Adler

It is certified that error appears in the above-identified patent and that said Letters Patent is hereby corrected as shown below:

At column 10, line 58, delete "oscilator signal $\theta_{1o}$" and insert therefor -- oscillator signal $\theta_{LO}$ --.

At column 10, line 59, delete "$\Psi$" and insert therefor -- $\Psi_o$ --.

At column 10, line 68, delete "signal" and insert therefor -- signals --.

At column 11, line 1, delete "FIG. 1" and insert therefor -- FIG. 11 --.

At column 11, line 12, delete "eqn (3)" and insert therefor -- eqn. (3) --.

At column 11, line 13, delete "oscilator" and insert therefor -- oscillator --.

At column 11, line 14, delete "r = 2r/c" and insert therefor -- $\tau$ = 2r/c --.

At column 11, line 17, delete "eqn (4)" and insert therefor -- eqn. (4) --.

At column 11, line 24, delete "$\theta_{IF}$ equal to" and insert therefor -- $\theta_{IF}$ is equal to --.

At column 11, line 25, delete "between phases" and insert therefor -- between the phases --.

UNITED STATES PATENT AND TRADEMARK OFFICE
CERTIFICATE OF CORRECTION

PATENT NO. : 5,134,411

DATED : July 28, 1992

INVENTOR(S) : Zdenek Adler

It is certified that error appears in the above-identified patent and that said Letters Patent is hereby corrected as shown below:

At column 12, line 37, delete "range $R_m$" and insert therefor -- range $R_u$ --.

At column 12, line 47, delete "Each of the n data have an" and insert therefor -- Each of the n data has a --.

At column 12, line 65, delete "equation (10) leads" and insert therefor -- equation (10), leads --.

At column 12, line 66, delete "response" and insert therefor -- response. --.

At column 12, line 67, delete "an alternative" and insert therefor -- An alternative --. At column 12, line 68, delete "index i." and insert therefor -- index i, as follows: --.

At column 13, line 31, delete "media of a known time" and insert therefor -- media with a known time --.

At column 13, line 32, delete "path include cables" and insert therefor -- path includes cables --.

At column 13, line 33, delete "between power splitter" and insert therefor -- between the power splitter --.

At column 13, line 34, delete "between receiving antenna" and insert therefor -- between the receiving antenna --.

UNITED STATES PATENT AND TRADEMARK OFFICE
CERTIFICATE OF CORRECTION

PATENT NO. : 5,134,411  Page 12 of 13
DATED : July 28, 1992
INVENTOR(S) : Zdenek Adler It is certified that error appears in the above-identified patent and that said Letters Patent is hereby corrected as shown below:

At column 14, line 12, delete "Targets which produce about equal signal at" and insert therefor -- For targets which produce about equal signals at --.

At column 14, line 14, delete "will be a average" and insert therefor -- will be an average --.

At column 14, line 16, delete "Targets which produce" and insert therefor -- For targets which produce --.

At column 14, line 19, delete "a distance" and insert therefor -- the distance --.

At column 14, line 20, delete "Targets which produce" and insert therefor -- For targets which produce --.

At column 14, line 24, delete "Targets which produce" and insert therefor -- For targets which produce --.

At column 14, line 28, delete "provided a magnitude" and insert therefor -- provided the magnitude --. At column 14, line 31, delete "in a closest target" and insert therefor -- in the closest target --.

UNITED STATES PATENT AND TRADEMARK OFFICE
CERTIFICATE OF CORRECTION

PATENT NO. : 5,134,411
DATED : July 28, 1992
INVENTOR(S) : Zdenek Adler

It is certified that error appears in the above-indentified patent and that said Letters Patent is hereby corrected as shown below:

Column 14, line 34, delete "further" and insert therefor --farther--

Signed and Sealed this

Twelfth Day of April, 1994

Attest:

BRUCE LEHMAN

Attesting Officer

Commissioner of Patents and Trademarks